US008443120B2

(12) United States Patent
Lu et al.

(10) Patent No.: US 8,443,120 B2
(45) Date of Patent: May 14, 2013

(54) METHOD FOR ACCESSING MULTIPLE CARD SLOTS AND APPARATUS FOR THE SAME

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 272 days.

(21) Appl. No.: 13/125,156

(22) PCT Filed: Oct. 25, 2010

(86) PCT No.: PCT/CN2010/078052
§ 371 (c)(1),
(2), (4) Date: Apr. 20, 2011

(87) PCT Pub. No.: WO2011/076035
PCT Pub. Date: Jun. 30, 2011

(65) Prior Publication Data
US 2012/0278508 A1 Nov. 1, 2012

(30) Foreign Application Priority Data
Dec. 24, 2009 (CN) .......................... 2009 1 0243881

(51) Int. Cl.
*G06F 5/00* (2006.01)

(52) U.S. Cl.
USPC ............................................. 710/36; 710/51

(58) Field of Classification Search ........................ None
See application file for complete search history.

(56) References Cited

U.S. PATENT DOCUMENTS 7,748,636 B2* 7/2010 Finn .............................. 235/492
2006/0214003 A1 9/2006 Morrow et al.

* cited by examiner

*Primary Examiner* — Idriss N Alrobaye
*Assistant Examiner* — Richard B Franklin
(74) *Attorney, Agent, or Firm* — Hammer & Associates, P.C.

(57) ABSTRACT

The present invention discloses a method for accessing multiple card slots and an apparatus for the same, which relate to data communication field. The method comprises establishing a connection from a CCID to a host, declaring at least a pair of IN/OUT endpoints used for implementing a response pipe and a command pipe as BULK-IN and BULK-OUT endpoints, declaring at least one IN endpoint used for implementing an event notification pipe as an interrupt endpoint, and declaring, by the CCID, the CCID itself as a device compliant with a CCID standard and the number of card slots supported by the CCID to the host; accessing the CCID by the host; receiving, by the CCID, a BULK-OUT packet and determining, by the CCID, a type of a CCID command issued by the host according to the BULK-OUT packet; in case the CCID command is a channel extension command, determining if it is a channel switch command; and if so, parsing the channel switch command and activating a card slot the host tries to access.

12 Claims, 4 Drawing Sheets

METHOD FOR ACCESSING MULTIPLE CARD SLOTS AND APPARATUS FOR THE SAME

FIELD OF THE INVENTION

The present invention relates to data communications, and more particularly, to a method for accessing multiple card slots and apparatus for the same.

BACKGROUND OF THE INVENTION

USB Chip/Smart Card Interface Device (CCID) specification is a standard established by some world-leading IT enterprises, and provides a possibility of communicating between the smartcard reader/writer and the host (including the embedded host). The CCID communicates with the host via the USB interface, and communicates with the smartcard in accordance with the ISO 7816 standard. The CCID driver is provided and supported by Microsoft Windows 2000 or higher. Thus, manufacturers are able to develop devices complying with the CCID interface standard easily. In addition, the CCID standard supports a PC/SC (Personal Computer/Smart Card) interface calling. A number of open source CCID drivers are also available for other open source operating systems, such as the various versions of Linux.

The CCID protocol is a single-channel protocol and supports access to multiple card slots. But only one card slot can be accessed when an operation is performed on the card reader with the CCID driver provided by Microsoft.

SUMMARY OF THE INVENTION

To access multiple card slots via the CCID protocol, the embodiments of the present invention provide a method for accessing multiple card slots and apparatus for the same.

In one aspect, the present invention provides a method for accessing multiple card slots. The method comprises the following steps of:

establishing a connection by a CCID with multiple card slots to a host, declaring at least a pair of IN/OUT endpoints used for implementing a response pipe and a command pipe as BULK-IN and BULK-OUT endpoints, declaring at least one IN endpoint used for implementing an event notification pipe as an interrupt endpoint, and declaring, by the CCID, the CCID itself as a device compliant with the CCID standard and the number of card slots supported by the CCID to the host;

accessing the CCID by the host;

receiving, by the CCID, a BULK-OUT packet and determining, by the CCID, a type of the CCID command issued by the host according to the BULK-OUT packet;

determining whether the channel extension command is a channel switch command if the CCID command is a channel extension command: if so, parsing the channel switch command and activating a card slot the host tries to access; otherwise, perform an operation according to the type of the channel extension command; and performing an operation according to the type of the CCID command if the CCID command is not a channel extension command.

The declaring the number of card slots supported by the CCID to the host comprises sending a card slot descriptor by the CCID to the host, in which a byte is used to indicate the number of card slots supported by the CCID.

The determining by the CCID the type of the CCID command issued by the host according to the BULK-OUT packet comprises parsing a command stream compliant with CCID standard by the CCID and obtaining the command type of the command stream through the first byte of the packet header of the command stream, in which the command stream is of a channel extension command if the first byte is "6B".

The determining whether the channel extension command is a channel switch command comprises parsing the channel extension command by the CCID and obtaining the type of the command according to an identifier field of the channel extension command, in which the identifier field is customized.

The parsing the channel switch command and activating a card slot the host will access comprises parsing the packet header of the channel switch command by a firmware program in the CCID; obtaining the size of the packet and its position in a transceiver buffer of the CCID by analyzing the data size flag in the packet header of the channel switch command and obtaining the identifier of the packet of the channel switch command, in which the identifier is used to indicate the usage of the channel switch command; if the channel switch command is used for switching from one card slot to another, checking the $13^{th}$ byte of the channel switch command to obtain the card slot number targeted by the channel switch command; and activating the card slot identified by the number of the card slot number by a circuit control unit of the CCID.

The method further comprises determining if information on a smart card insertion/removal event in the activated card slot exists, if so, returning the information on a smart card insertion/removal event compliant with the CCID standard to the host; otherwise, continuing the step of receiving the BULK-OUT packet by the CCID.

The determining if information on a smart card insertion/removal event exists comprises determining if the information on a smart card insertion/removal event exists in the transceiver buffer of the CCID, which is written to the transceiver buffer when the CCID has received an interrupt signal of smart card insertion/removal.

In another aspect, the present invention provides a CCID with multiple card slots. The CCID comprises an interface module, a control module, a determination module, and a card slot switch circuit module, in which: the interface module is coupled to a host and the control module respectively and is adapted to communicate information between the host and the control module; the control module is coupled to the interface module and the determination module respectively and is adapted to control the interface module to receive a command stream issued by the host, control the determination module to receive a response packet from a smart card and send a packet of the command stream to the smart card, and control the interface module to send a response packet compliant with the CCID standard to the host; the determination module is coupled to the control module and the card slot switch circuit module respectively and is adapted to determine if information on a smart card insertion/removal event exists in the CCID and if so, return the information to the host via the control module; and the card slot switch circuit module is coupled to the determination module and the multiple card slots respectively and is adapted to receive the command stream transmitted by the control module and activate a card slot according to the number of card slot after a channel switch command is received from the control module, or if a command other than the channel switch command is received from the control module, send the command to the smart card and then send a response packet from the smart card to the determination module.

The interface module comprises a descriptor setting unit and an endpoint setting unit, in which: the descriptor setting unit is adapted to set up a device type descriptor and a card slot descriptor compliant with the CCID standard, with which the CCID reports itself to the host as a CCID and reports to the host the number of card slots it supports respectively; and the endpoint setting unit is adapted to set at least a pair of IN/OUT endpoints used for implementing a response pipe and a command pipe to a BULK-IN endpoint and a BULK-OUT endpoint and declare at least one IN endpoint used for implementing an event notification pipe as an interrupt endpoint.

The control module comprises a receiving unit adapted to receive a command stream from the host through the interface module and receive a response from the smart card through the determination module; a parse unit adapted to parse the command stream received by the receiving unit; an obtaining unit adapted to parse the first byte of the packet header of the command stream processed by the parse unit and obtain the type of the command stream and if the first byte is "6B", the command stream is of channel extension command; a calculation unit adapted to determine the length of the data packet of the command stream and its position in the transceiver buffer of the CCID according to the flag of data length in the command stream received by the receiving unit; a response forming unit adapted to convert a response to a response packet compliant with the CCID standard; a first determination unit adapted to determine the type of the CCID command issued by the host according to the BULK-OUT packet received by the receiving module; a second determination unit adapted to determine if the channel extension command is a channel switch command when the CCID command is a channel extension command which has been determined by the first determination unit; a first processing unit adapted to perform an operation according to the type of the CCID command when the CCID command is not a channel extension command which has been determined by the first determination unit; a second processing unit adapted to perform an operation according to the type of the channel extension command when the channel extension command is not a channel switch command which has been determined by the second determination unit; and a sending unit adapted to send the command stream issued by the host to the smart card and send a response from the smart card to the host.

The second determination unit comprises means for obtaining the packet header of the channel switch command; means for learning the size of the packet and its position in the transceiver buffer of the CCID by the data size flag in the packet header of the channel switch command, and obtaining an identifier (which is used to indicate the specific usage of the channel switch command) in the channel switch command packet; and means for checking the 13$^{th}$ byte of the channel switch command and obtaining the number of the card slot targeted by the command switch command in case the identifier indicates that the channel switch command is used to switch from one card slot to another.

The determination module is particularly adapted to determine if information on a smart card insertion/removal event exists in the transceiver buffer of the CCID, which is written to the transceiver buffer when the CCID has received an interrupt signal of smart card insertion/removal.

In this way, the present invention provides a solution to allow the driver of the reader to access multiple card slots under both Windows and Linux.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

Figure 1:
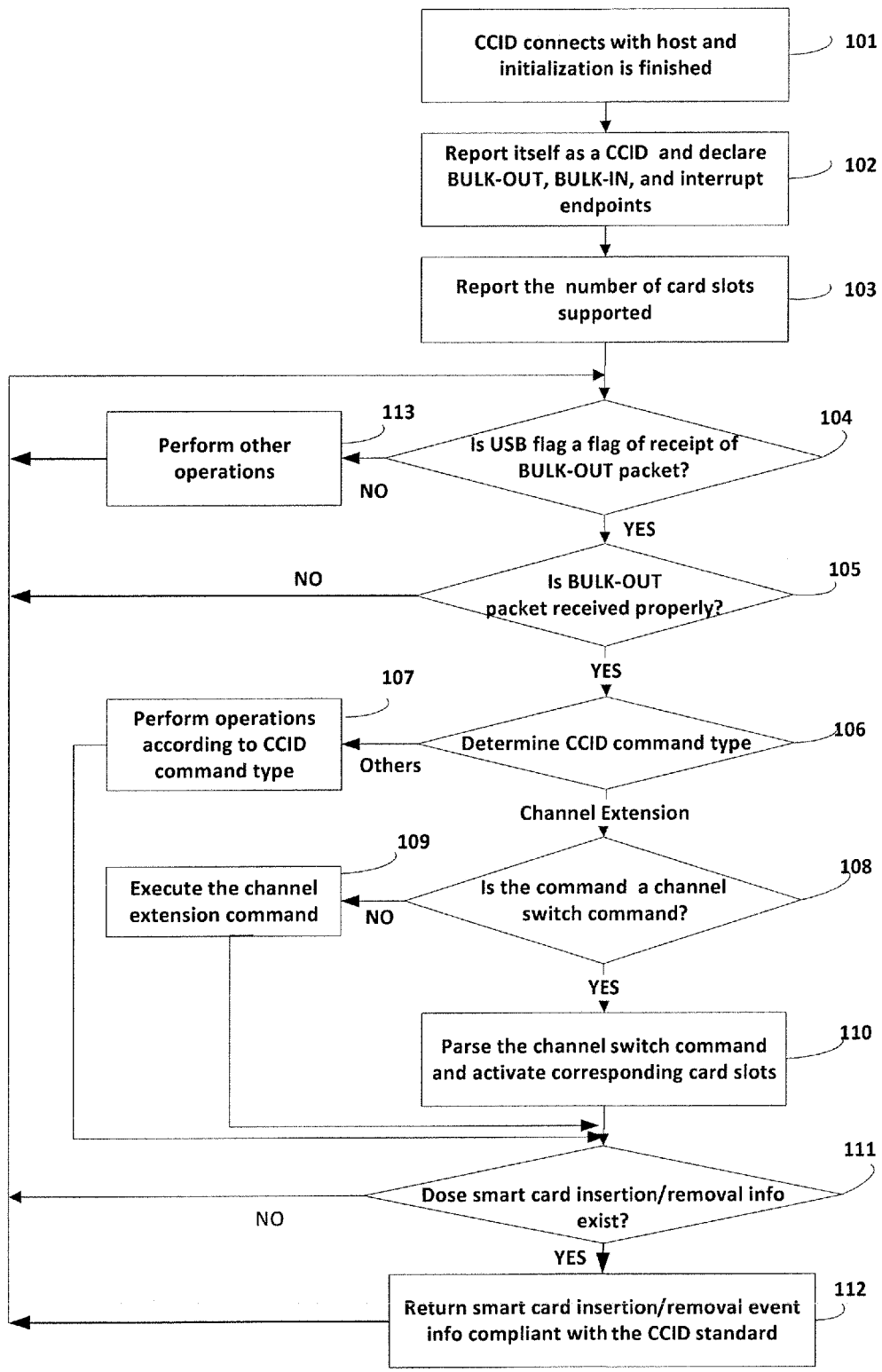
FIG. 1 is a flow diagram of the method for accessing multiple card slots by inquiry in accordance with the first embodiment of the present invention.

To provide more clarity of the purpose, technical solutions, and benefits of the present invention, the embodiments of the present invention are described in combination with the drawings below in details.

Before the description of the embodiments of the present invention in details, it should be noted that the device compliant with the CCID interface standard must have at least a pair of IN/OUT endpoints which are declared as a BULK-IN endpoint and a BULK-OUT endpoint to implement a response pipe and a command pipe, and at least one IN endpoint which is declared as an interrupt endpoint to implement an event notification pipe. The descriptors of the device compliant with the CCID interface standard are characterized in that: in the interface descriptor, byte 0 indicates the length of descriptor (in bytes) and its value is 09h, byte 1 indicates a fixed terminal and its value is 04h, byte 4 indicates a supported terminal number (except terminal 0) and its value is 02h or 03h, byte 5 indicates the class code and its value is 0Bh, byte 6 indicates the subclass code and its value is 00h, and byte 7 indicates the protocol code and its value is 00h; and in the type descriptor, byte 0 indicates the length of the descriptor (in bytes) and its value is 36h, byte 2 indicates the version number of the CCID specification, which is a decimal number in binary representation and its value is 0100h, byte 52 indicates support for PIN and its value is 00h to 03h. The bytes in other descriptors of the device compliant with the CCID standard, such as the device descriptor and the configuration descriptor, and other bytes in the interface descriptor and the type descriptor should be set in accordance with the USB protocol.

Embodiment 1

This embodiment describes a method for accessing multiple card slots. A CCID reader with multiple card slots is taken as an example of the CCID in this embodiment. The reader is connected with a host on which a driver of the reader compliant with the CCID standard from Microsoft is installed. The multiple card slots share a USB bus to communicate with the host by using a customized channel switch command in combination with a card slot switch circuit. The host can communicate with the CCID via two communication pipes: the bulk transfer pipe and the interrupt transfer pipe. The bulk transfer pipe is used to transmit data, such as power-up and power-off commands and execute APDUs (Application Protocol Data Units). The data interaction between the host and the CCID is implemented in request/response mode through the bulk transfer pipe. The interrupt transfer pipe is used to transmit asynchronous events, such as card insertion, card removal, and card short circuit (in these cases, the CCID sends a signal to the host via the interrupt transfer pipe). Referring to FIG. 1, the method comprises the following steps:

Step 101: A CCID connects with a host and conducts initialization; in the present embodiment, the CCID is connected to the host via a USB interface.

In particular, the initialization of the CCID may include the initialization of interrupt vectors and I/O signals. The interrupt may be a USB interrupt or a card insertion/removal event interrupt.

Step 102: After the initialization, the CCID sets at least a pair of IN/OUT endpoints used to implement a response pipe and a command pipe and declares them as a BULK-IN endpoint and a BULK-OUT endpoint respectively, sets at least one IN endpoint used to implement an event notification pipe and declares it as an interrupt endpoint, and reports to the host its compliance with the CCID interface standard.

The CCID can declare itself by a device type descriptor. In this case, the device does that as follows: it sends a CCID-type device descriptor to the host connected with it; and then the host recognizes the device as a CCID after receiving the device descriptor.

Step 103: The CCID reports the number of card slots it supports to the host.

The number of card slots can be reported by a device card slot descriptor. In this case, the CCID does that as follows: it sends a card slot descriptor to the host connected with it, in which one byte is used to indicate the supported number of card slots. For example, only one card slot is supported if the card slot descriptor is "00"; two card slots are supported if the descriptor is "01"; and three card slots are supported if the descriptor is "02", and so on.

After receiving the card slot descriptor, the host loads a reader driver. That is, it creates a physical device object for the card slots of the reader. If the host loads a reader driver from Microsoft compliant with the CCID protocol, the host will create only one physical device object for the reader with multiple card slots (i.e. the physical device object will be created for the default card slot, such as Card Slot 1). If the host loads a reader driver for Linux compliant with the CCID protocol, the host will create a set of physical device objects corresponding to each of the card slots according to the card slot descriptor after receiving the card slot descriptor.

Step 104: The CCID verifies the USB flag and determines if it is a flag of receipt of BULK-OUT packet: if so, it goes to step 105; otherwise, it goes to step 113.

The USB flag is set or cleared by the hardware circuit of the CCID. The USB flag includes the size of packet flag, the type of packet flag, and received packet flag etc. For example, the received USB flag can be a flag of SETUP packet, a flag of IN packet, a flag of BULK-OUT packet, or a flag of size of BULK-OUT packet.

Step 105: The CCID receives a BULK-OUT packet and determines if it has received the BULK-OUT packet properly: if so, it goes to step 106; otherwise, it goes to step 104.

The process of determining if the BULK-OUT packet has been received properly can be the following: determining if the BULK-OUT packet is received properly or not by comparing the received size of the packet with the sent size of the packet—if they are equal, the packet has been received properly.

Step 106: The CCID parses the content of the BULK-OUT packet and determines the type of the command: if the command is a channel extension command, it goes to step 108; otherwise, it goes to step 107.

The process of determining the type of the command can be the following: the CCID parses the command stream compliant with the CCID standard, and obtains the type of the command by the first byte of the packet header of the command stream. For example, if the first byte is "6B", the command is a channel extension command; if the first byte is "62", the command is a power-on command; if the first byte is "61", the command is a parameter setting command, and so on.

The channel extension command is defined by the manufacturer. The manufacturer can modify the $11^{th}$ and $12^{th}$ bytes (the identifier field) of the channel extension command to implement custom features, such as channel switch and encryption/decryption of data on the transfer channel.

Step 107: The CCID performs operations according to the type of the CCID command, creates a packet of the result of the operations, which is compliant with the CCID interface standard, saves the packet to the buffer of the CCID, and goes to step 111.

The following operations can be performed by the CCID according to the type of the CCID command: the CCID conducts power-on or power-off of the smart card in its slot if the type of the command is of smart card power-on or power-off; the CCID conducts PPS (Protocol and Parameter Select) of the smart card in its slot if the type of the command is of PPS; and the CCID reads data from or writes data to the smart card if the command is of such type.

The $6^{th}$ byte of the CCID command (the Slot field) indicates the number of the card slot of the CCID with multiple card slots on which the command will be executed.

In addition, the $6^{th}$ byte is always "00" if a reader driver compliant with the CCID standard from Microsoft has been loaded into the host.

But if a reader driver compliant with the CCID standard has been loaded into the host under Linux, the $6^{th}$ byte of the CCID command (the Slot field) indicates the number of the card slot of the CCID with multiple card slots on which the command will be executed. For example, the following command indicates to get a random number through the card seat 1 and the $6^{th}$ byte indicates the card slot 1:

6f 05 00 00 00 00 10 00 00 00 00 84 00 00 08

The following command indicates power-on of card seat 2, and the $6^{th}$ byte indicates the card slot 2:

62 00 00 00 00 01 21 01 00 00

An operation will be performed on the specified card slot by the CCID according to the number of card slot after receiving a command compliant with the CCID standard.

Preferably, a reader driver compliant with CCID standard from Microsoft is installed on the host in this embodiment.

Step 108: The CCID determines if the channel extension command is a channel switch command: if so, go to step 110; otherwise, go to step 109.

To determine if the channel extension command is a channel switch command, the firmware program in the CCID gets the size of the packet, its position in the buffer of the CCID, and the identifier in the packet of the command stream (the $11^{th}$ and $12^{th}$ bytes) through the packet header of the channel extension command and the data length flag in the packet header. The identifier can be customized by the manufacturer. It can be used to learn the usage of the channel extension command. For example, "0x5aa5" means that the channel extension command is a channel switch command used for switching from a card slot to another.

Step 109: Perform an operation corresponding to the channel extension command and go to step 111.

The channel extension command can be used to encrypt/decrypt the data on the transfer channel, read data from the flash memory, or write data to the flash memory. The CCID can perform one of such operations. For example, the following command indicates to read data from the flash memory of the CCID (the $11^{th}$ and $12^{th}$ bytes are customized to define the operation): 6B 05 00 00 00 00 00 00 00 00 00 6066 84 00 08; and the following command indicates to write data to the flash memory of the CCID (the 11$^{th}$ and 12$^{th}$ bytes are customized to define the operation): 6B 05 00 00 00 00 00 00 00 00 6660 84 00 08.

Step 110: The firmware program in the CCID parses the received channel switch command and activate the specified card slot through the card slot switch circuit.

The firmware program in the CCID detects which card slot should be activated by analyzing the 13$^{th}$ byte of the channel switch command. Then, the circuit controller unit of the CCID activates the card slot.

In this embodiment, the reader driver compliant with the CCID standard from Microsoft is used. Thus, the Slot field (the 6$^{th}$ byte) of the channel switch command is always "00".

For example, the following channel switch command indicates a random number instruction of the card slot 1 and its 13$^{th}$ byte means card slot 1: 6B 04 00 00 00 00 00 00 00 00 5a a5 00 ff; and the following channel switch command indicates a random number instruction of the card slot 2 and its 13th byte means card slot 2: 6B 04 00 00 00 00 00 00 00 00 5a a5 01 ff.

The circuit controller unit of the CCID can activate the card slot as follows: the card slot switch circuit of the CCID is adapted to include a CPU (Central Processing Unit), a CPU interface, a channel selection switch, and a circuit controller unit, in which the channel selection switch is coupled to each of the card slots (e.g. card slot 1, card slot 2, and card slot 3) of the CCID; the channel selection switch gets the circuit of the corresponding card slot connected under control of the circuit controller unit after the CCID has detected the number of the card slot.

Or, the circuit controller unit of the CCID can activate the card slot as follows: the card slot switch circuit of the CCID is adapted to include a CPU, more than one CPU interface, and a circuit controller unit, in which the more than one CPU interface are coupled to each of the card slots of the CCID respectively; the circuit controller unit gets the circuit between a CPU interface and an associated card slot connected after the CCID has detected the number of the card slot.

Step 111: The CCID detects if smart card insertion/removal event information exists in its buffer: if so, go to step 112; otherwise, go back to step 104.

The smart card insertion/removal event information is written to the buffer by the CCID when it detects smart card insertion or removal.

There are two cases for a card slot: a card has been inserted into the card slot or no card is inserted. If there is no card in the slot, a "No Card" interrupt signal will be produced. Otherwise, the card slot is in "unpowered with a card" status and a "Card Inside" interrupt signal will be produced. After the host issues a power-up instruction and the smart card responds and returns an ATR (Answer to Reset), the card slot is brought into "powered with a card" status. If the host issues a power-off instruction, the card slot will be brought into "unpowered with a card" status again.

If a card slot has been activated, a "Card Inside" interrupt signal (0x5003) will be produced when a smart card is inserted into it. If a smart card is removed from a card slot, a "No Card" interrupt signal (0x5002) will be produced. If a card slot is in unactivated status, the insertion/removal event will not produce any interrupt signal.

If a reader driver from Microsoft compliant with the CCID protocol has been loaded into the host, the card insertion/removal event in the CCID with multiple card slots will produce the same interrupt message. For example:

| | |
|---|---|
| Card Inserted into Card Slot 1 | 0x5003 |
| Card Inserted into Card Slot 2 | 0x5003 |
| Card Inserted into Card Slot 3 | 0x5003 |
| Card Removed from Card Slot 1 | 0x5002 |
| Card Removed from Card Slot 2 | 0x5002 |
| Card Removed from Card Slot 3 | 0x5002 |

If a reader driver for Linux compliant with the CCID protocol has been loaded into the host the card insertion/removal event in the CCID with multiple card slots will produce different interrupt messages for different card slots. For example:

| | |
|---|---|
| Card Inserted into Card Slot 1 | 0x5003 |
| Card Inserted into Card Slot 2 | 0x500c |
| Card Inserted into Card Slot 3 | 0x5030 |
| Card Removed from Card Slot 1 | 0x5002 |
| Card Removed from Card Slot 2 | 0x5008 |
| Card Removed from Card Slot 3 | 0x5020 |

Step 112: The CCID arranges the smart card insertion/removal event information to form a packet compliant with CCID interface standard and returns the packet to the host, and goes to step 104;

Step 113: The CCID performs other operations and goes back to step 104. The above embodiment provides a method for accessing multiple card slots, enabling the reader driver for Windows or Linux to support access to multiple card slots.

Embodiment 2

Figure 2:
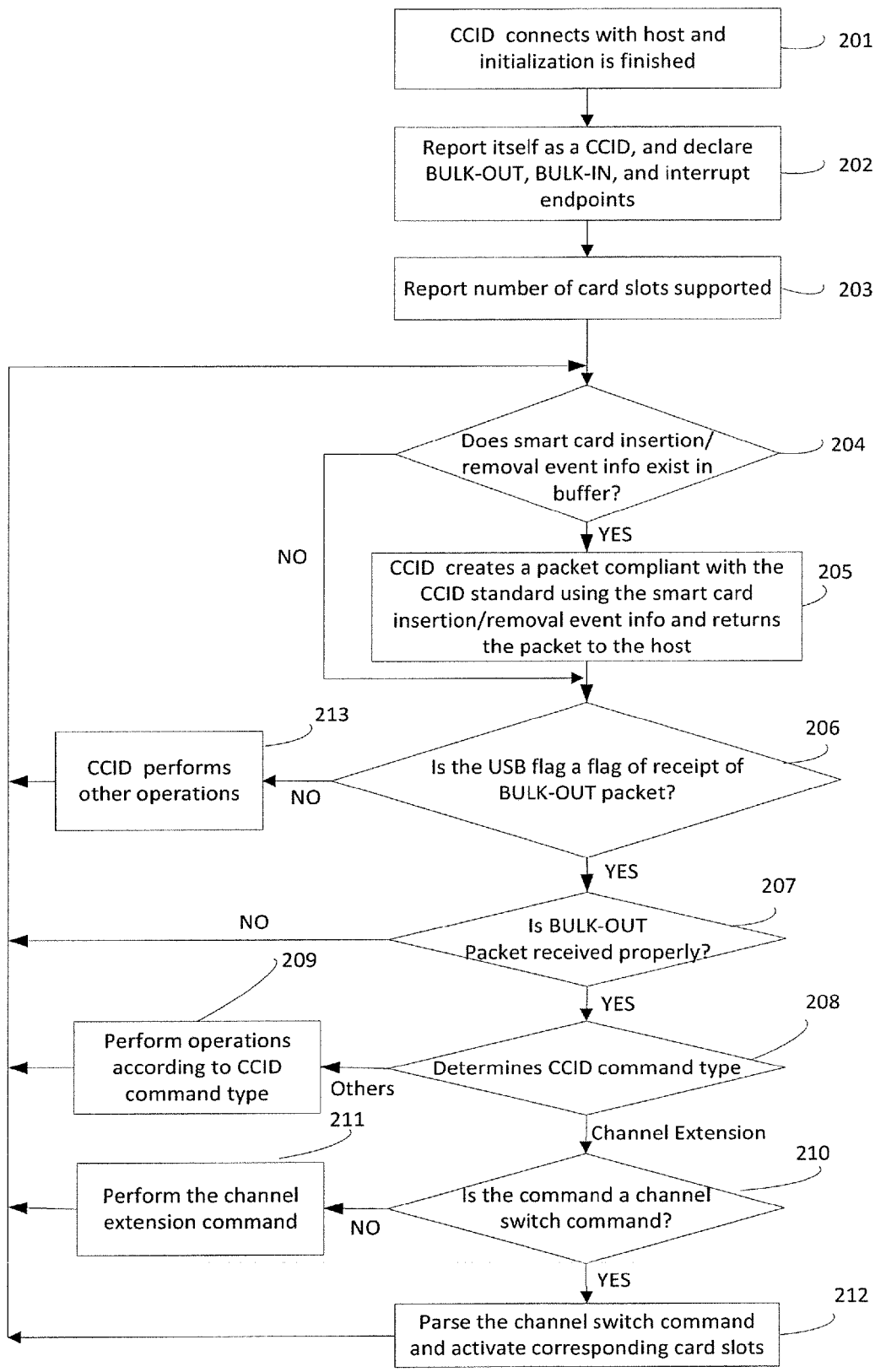
FIG. 2 is a flow diagram of the method for accessing multiple card slots by inquiry in accordance with the second embodiment of the present invention.

This embodiment describes a method for accessing multiple card slots. A CCID reader with multiple card slots is taken as an example of CCID in this embodiment. The reader is connected with a host on which a driver of the reader compliant with the CCID standard from Microsoft is installed. The multiple card slots share a USB bus to communicate with the host by using a customized channel switch command in combination with a card slot switch circuit. The host can communicate with the CCID via two communication pipes: the bulk transfer pipe and the interrupt transfer pipe. The bulk transfer pipe is used to transmit data, such as power-up and power-off commands and execute APDUs (Application Protocol Data Units). The data interaction between the host and the CCID is implemented in request/response mode through the bulk transfer pipe. The interrupt transfer pipe is used to transmit asynchronous events, such as card insertion, card removal, and card short circuit (in these cases, the CCID sends a signal to the host via the interrupt transfer pipe). Referring to FIG. 2, the method comprises the following steps:

Step 201: A CCID connects with a host and conducts initialization.

In this embodiment, the CCID connects with the host via a USB interface.

In particular, the initialization of the CCID may include the initialization of interrupt vectors and I/O signals. The interrupt may be a USB interrupt or a card insertion/removal event interrupt.

Step 202: After the initialization, the CCID sets at least a pair of IN/OUT endpoints used to implement a response pipe and a command pipe and declares them as a BULK-IN endpoint and a BULK-OUT endpoint respectively, sets at least one IN endpoint used to implement an event notification pipe and declares it as an interrupt endpoint, and reports to the host its compliance with the CCID interface standard.

The CCID can declare itself by a device type descriptor. In this case, the device does that as follows: it sends a CCID-type device descriptor to the host connected with it; and then the host recognizes the device as a CCID after receiving the device descriptor.

Step 203: The CCID reports the number of card slots it supports to the host.

The number of card slots can be reported by a device card slot descriptor. In this case, the CCID does that as follows: it sends a card slot descriptor to the host connected with it, in which a byte is used to indicate the supported number of card slots. For example, only one card slot is supported if the card slot descriptor is "00", and two card slots are supported if the descriptor is "01".

After receiving the card slot descriptor, the host loads a reader driver. That is, it creates a physical device object for the card slots of the reader. If the host loads a reader driver compliant with the CCID protocol from Microsoft, the host will create only one physical device object for the reader with multiple card slots (i.e. the physical device object will be created for the default card slot, such as Card Slot 1) after receiving the card slot descriptor. If the host loads a reader driver for Linux compliant with the CCID protocol, the host will create a set of physical device objects corresponding to each of the card slots according to the card slot descriptor after receiving the card slot descriptor.

Step 204: The CCID detects if smart card insertion/removal event information exists in the buffer.

If so, it goes to step 205; otherwise, it goes to step 206.

The smart card insertion/removal event information is written to the buffer by the CCID when it detects smart card insertion or removal.

There are two cases for a card slot: a card has been inserted into the card slot or no card is inserted. If there is no card in the slot, a "No Card" interrupt signal will be produced. Otherwise, the card slot is in "unpowered with a card" status and a "Card Inside" interrupt signal will be produced. After the host issues a power-up instruction and the smart card responds and returns an ATR (Answer to Reset), the card slot is brought into "powered with a card" status. If the host issues a power-off instruction, the card slot will be brought into "unpowered with a card" status again.

If a card slot has been activated, a "Card Inside" interrupt signal (0x5003) will be produced when a smart card is inserted into it. If a smart card is removed from a card slot, a "No Card" interrupt signal (0x5002) will be produced. If a card slot is in unactivated status, the insertion/removal event will not produce any interrupt signal.

If a reader driver from Microsoft compliant with the CCID protocol has been loaded into the host, the card insertion/removal event in the CCID with multiple card slots will produce the same interrupt message. For example:

| Card Inserted into Card Slot 1 | 0x5003 |
| Card Inserted into Card Slot 2 | 0x5003 |
| Card Inserted into Card Slot 3 | 0x5003 |
| Card Removed from Card Slot 1 | 0x5002 |
| Card Removed from Card Slot 2 | 0x5002 |
| Card Removed from Card Slot 3 | 0x5002 |

If a reader driver for Linux compliant with the CCID protocol has been loaded into the host, the card insertion/removal event in the CCID with multiple card slots will produce different interrupt messages for different card slots. For example:

| Card Inserted into Card Slot 1 | 0x5003 |
| Card Inserted into Card Slot 2 | 0x500c |
| Card Inserted into Card Slot 3 | 0x5030 |
| Card Removed from Card Slot 1 | 0x5002 |
| Card Removed from Card Slot 2 | 0x5008 |
| Card Removed from Card Slot 3 | 0x5020 |

Step 205: The CCID arranges the smart card insertion/removal event information to form a packet compliant with the CCID interface standard and returns the packet to the host, and goes to step 204.

Step 206: The CCID verifies the USB flag and determines if it is a flag of receipt of BULK-OUT packet: if so, it goes to step 207; otherwise, it goes to step 213.

The USB flag is set or cleared by the hardware circuit of the CCID. The USB flag includes the flag of the packet size, the flag of the packet type, and received packet flag, etc. For example, the USB flag can be a flag of SETUP packet, a flag of IN packet, a flag of BULK-OUT packet, or a flag of the size of BULK-OUT packet.

Step 207: The CCID receives a BULK-OUT packet and determines if it has received the packet properly: if so, it goes to step 208; otherwise, it goes to step 204.

The process of determining if the BULK-OUT packet has been received properly can be the following: determining if the BULK-OUT packet is received properly or not by comparing the received size of the packet with the sent size of the packet—if they are equal, the packet has been received properly.

The channel extension command is defined by the manufacturer. The manufacturer can modify the $11^{th}$ and $12^{th}$ bytes of the channel extension command to implement custom features, such as channel switch and encryption/decryption of data on the transfer channel.

Step 208: The CCID parses the content of the BULK-OUT packet and determines the type of the CCID command: if the command is a channel extension command, it goes to step 210; otherwise, it goes to step 209.

The process of determining the type of the command can be the following: the CCID parses the command stream compliant with the CCID standard, and obtains the type of the command by the first byte of the packet header of the command stream. For example, if the first byte is "6B", the command is a channel extension command; if the first is "62", the command is a power-on command; if the first byte is "61", the command is a parameter setting command, and so on.

Step 209: The CCID performs operations according to the type of the CCID command, creates a packet of the result of the operations, which is compliant with the CCID interface standard, saves the packet to the buffer of the CCID, and goes to step 204.

The following operations can be performed by the CCID according to the type of the CCID command: the CCID conducts power-on or power-off of the smart card in its slot if the type of the command is of smart card power-on or power-off; the CCID conducts PPS of the smart card in its slot if the type of the command is of PPS (Protocol and Parameter Select); and the CCID reads data from or writes data to the smart card if the command is of such type.

The $6^{th}$ byte of the CCID command (the Slot field) indicates the number of the card slot of the CCID with multiple card slots on which the command will be executed.

In addition, the $6^{th}$ byte is always "00" if a reader driver compliant with the CCID standard from Microsoft has been loaded into the host.

But if a reader driver compliant with the CCID standard has been loaded into the host under Linux, the 6$^{th}$ byte of the CCID command (the Slot field) indicates the number of the card slot of the CCID with multiple card slots on which the command will be executed. For example, the following command indicates to get a random number through the card seat 1 and the 6$^{th}$ byte indicates the card slot 1:

6f 05 00 00 00 00 10 00 00 00 00 84 00 00 08

The following command indicates power-on of card seat 2, and the 6$^{th}$ byte indicates the card slot 2:

62 00 00 00 00 01 21 01 00 00

An operation will be performed on the specified card slot by the CCID according to the number of card slot after receiving a command compliant with the CCID standard.

Preferably, a reader driver compliant with the CCID standard from Microsoft is installed on the host in this embodiment.

Step 210: The CCID determines if the channel extension command is a channel switch command: if so, go to step 212; otherwise, go to step 211.

To determine if the channel extension command is a channel switch command, the firmware program in the CCID gets the size of the packet, its position in the buffer of the CCID, and the identifier in the packet of the command stream (the 11$^{th}$ and 12$^{th}$ bytes) through the packet header of the channel extension command and the data length flag in the packet header. The identifier can be customized by the manufacturer. It can be used to learn the usage of the channel extension command. For example, "0x5aa5" means that the channel extension command is a channel switch command used for switching from a card slot to another.

Step 211: Perform an operation corresponding to the channel extension command and go back to step 204.

The channel extension command can be used to encrypt/decrypt the data on the transfer channel, read data from the flash memory, or write data to the flash memory. The CCID can perform one of such operations. For example, the following command indicates to read data from the flash memory of the CCID (the 11$^{th}$ and 12$^{th}$ bytes are customized to define the operation): 6B 05 00 00 00 00 00 00 00 00 6066 84 00 08; and the following command indicates to write data to the flash memory of the CCID (the 11$^{th}$ and 12$^{th}$ bytes are customized to define the operation): 6B 05 00 00 00 00 00 00 00 00 6660 84 00 08.

Step 212: The firmware program the CCID parses the received channel switch command and activates the specified card slot through the card slot switch circuit, and then the process goes back to step 204.

The firmware program in the CCID parses the packet header of the channel switch command and learns the size of the packet, its position in the buffer of the CCID, and the identifier in the packet of the command stream through the data length flag in the packet header. The identifier can be customized by the manufacturer of the CCID. It can be used to indicate the usage of the channel switch command. If the identifier indicates that the channel switch command is used for card slot switch, the card slot to be activated can be determined by analyzing the 13$^{th}$ byte of the channel switch command. Then, the circuit controller unit of the CCID activates the card slot accordingly.

In this embodiment, the reader driver compliant with the CCID standard from Microsoft is used. Thus, the Slot field (the 6$^{th}$ byte) of the channel switch command is a fixed value "00".

For example, the following channel switch command indicates a random number instruction of the card slot 1 and its 13$^{th}$ byte means card slot 1: 6B 04 00 00 00 00 00 00 00 00 5a a5 00 ff; and the following channel switch command indicates a random number instruction of the card slot 2 and its 13th byte means card slot 2: 6B 04 00 00 00 00 00 00 00 00 5a a5 01 ff.

The circuit controller unit of the CCID can activate the card slot as follows: the card slot switch circuit of the CCID is adapted to include a CPU (Central Processing Unit), a CPU interface, a channel selection switch, and a circuit controller unit, in which the channel selection switch is coupled to each of the card slots (e.g. card slot 1, card slot 2, and card slot 3) of the CCID; the channel selection switch gets the circuit of the corresponding card slot connected under control of the circuit controller unit after the CCID has detected the number of the card slot.

Or, the circuit controller unit of the CCID can activate the card slot as follows: the card slot switch circuit of the CCID is adapted to include a CPU, more than one CPU interface, and a circuit controller unit, in which the more than one CPU interface are coupled to each of the card slots of the CCID respectively; the circuit controller unit gets the circuit between a CPU interface and an associated card slot connected after the CCID has detected the number of the card slot.

Step 213: The CCID performs other operations and goes back to step 204.

The above embodiment provides a method for accessing multiple card slots, enabling the reader driver for Windows or Linux to support access to multiple card slots.

Embodiment 3

Figure 3:
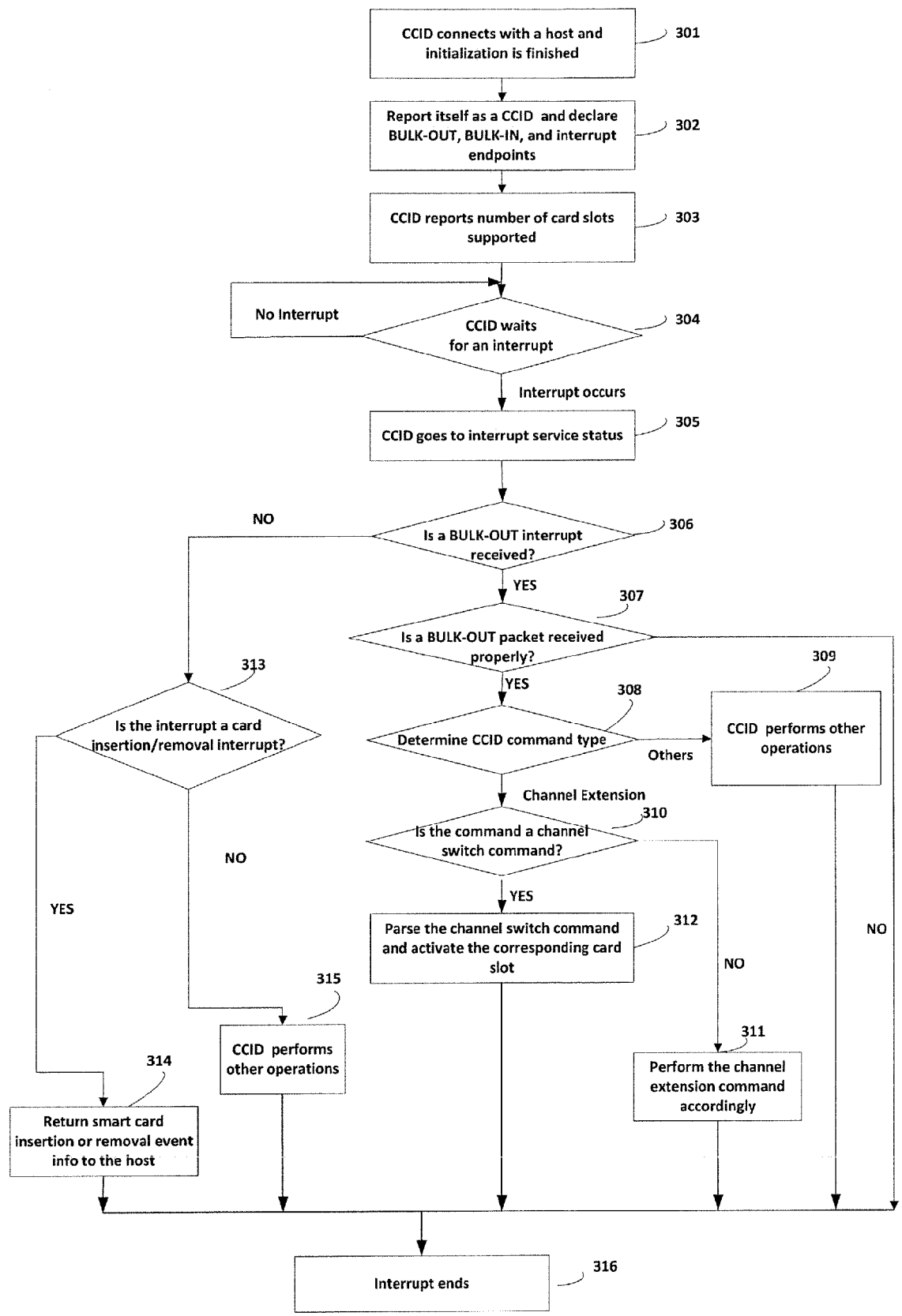
FIG. 3 is a flow diagram of the method for accessing multiple card slots by interrupt in accordance with the third embodiment of the present invention.

This embodiment describes a method for accessing multiple card slots. A CCID reader with multiple card slots is taken as an example of CCID in this embodiment. The reader is connected with a host on which a driver of the reader compliant with the CCID standard from Microsoft is installed. The multiple card slots share a USB bus to communicate with the host by using a customized channel switch command in combination with a card slot switch circuit. The host can communicate with the CCID via two communication pipes: the bulk transfer pipe and the interrupt transfer pipe. The bulk transfer pipe is used to transmit data, such as power-up and power-off commands and execute APDUs (Application Protocol Data Units). The data interaction between the host and the CCID is implemented in request/response mode through the bulk transfer pipe. The interrupt transfer pipe is used to transmit asynchronous events, such as card insertion, card removal, and card short circuit (in these cases, the CCID sends a signal to the host via the interrupt transfer pipe). Referring to FIG. 3, the method comprises the following steps.

Step 301: A CCID connects with a host and conducts initialization.

In this embodiment, the CCID connects with the host via a USB interface.

In particular, the initialization of the CCID includes the initialization of interrupt vectors and I/O signals. The interrupt may be a USB interrupt or a card insertion/removal event interrupt.

Step 302: After the initialization, the CCID sets at least a pair of IN/OUT endpoints used to implement a response pipe and a command pipe and declares them as a BULK-IN endpoint and a BULK-OUT endpoint respectively, and sets at least one IN endpoint used to implement an event notification pipe and declares it as an interrupt endpoint, and reports to the host its compliance with the CCID interface standard.

The CCID can declare itself by a device type descriptor. In this case, the device does that as follows: it sends a CCID-type device descriptor to the host connected with it; and then the host recognizes the device as a CCID after receiving the device descriptor.

Step 303: The CCID reports the number of card slots it supports to the host.

The number of card slots can be reported by a device card slot descriptor. In this case, the CCID does that as follows: it sends a card slot descriptor to the host connected with it, in which a byte is used to indicate the supported number of card slots. For example, only one card slot is supported if the card slot descriptor is "00"; and two card slots are supported if the descriptor is "01".

After receiving the card slot descriptor, the host loads a reader driver. That is, it creates a physical device object for the card slots of the reader. If the host loads a reader driver compliant with the CCID protocol from Microsoft, the host will create only one physical device object for the reader with multiple card slots (i.e. the physical device object will be created for the default card slot, such as Card Slot 1) after receiving the card slot descriptor. If the host loads a reader driver for Linux compliant with the CCID protocol, the host will create a set of physical device objects corresponding to each of the card slots according to the card slot descriptor after receiving the card slot descriptor.

Step 304: The CCID waits for an interrupt.

If an interrupt occurs, the CCID goes to step 305 for interrupt service; otherwise, it goes on to wait for an interrupt.

Preferably, the same interrupt entry to the interrupt service is used for the USB interrupt and the card insertion/removal event interrupt. Or, if different interrupt entries are used for the USB interrupt and the card insertion/removal event interrupt, the USB interrupt will bring the CCID into the USB interrupt service and the card insertion/removal event interrupt will bring the device into the card insertion/removal event interrupt service.

Step 305: The CCID goes to the interrupt service.

Step 306: The CCID determines if the interrupt is a BULK-OUT interrupt: if so, it goes to step 307; otherwise, it goes to step 313.

Step 307: The CCID receives a BULK-OUT packet and determines if it has received the packet properly: if so, it goes to step 308; otherwise, it goes to step 316.

Step 308: The CCID parses the content of the BULK-OUT packet and determines the type of the CCID command: if the command is a channel extension command, it goes to step 310; otherwise, it goes to step 309.

The channel extension command is defined by the manufacturer. The manufacturer can modify the $11^{th}$ and $12^{th}$ bytes of the channel extension command to implement custom features, such as channel switch and encryption/decryption of data on the transfer channel.

Step 309: The CCID performs operations according to the type of the CCID command, creates a packet of the result of the operations, which is compliant with the CCID interface standard, saves the packet to the buffer of the CCID, and goes to step 316.

The following operations can be performed by the CCID according to the type of the CCID command: the CCID conducts power-on or power-off of the smart card in its slot if the type of the command is of smart card power-on or power-off; the CCID conducts PPS of the smart card in its slot if the type of the command is of PPS (Protocol and Parameter Select); and the CCID reads data from or writes data to the smart card if the command is of such type.

The $6^{th}$ byte of the CCID command (the Slot field of the command) indicates the number of the card slot of the CCID with multiple card slots on which the command will be executed.

In addition, the $6^{th}$ byte is always "00" if a reader driver compliant with the CCID standard from Microsoft has been loaded into the host.

But if a reader driver compliant with the CCID standard has been loaded into the host under Linux, the $6^{th}$ byte of the CCID command (the Slot field) indicates the number of the card slot of the CCID with multiple card slots on which the command will be executed. For example, the following command indicates to get a random number through the card seat 1 and the $6^{th}$ byte indicates the card slot 1:

6f 05 00 00 00 00 10 00 00 00 00 84 00 00 08

The following command indicates power-on of card seat 2, and the $6^{th}$ byte indicates the card slot 2:

62 00 00 00 00 01 21 01 00 00

An operation will be performed on the specified card slot by the CCID according to the number of card slot after receiving a command compliant with the CCID standard.

Preferably, a reader driver compliant with the CCID standard from Microsoft is installed on the host in this embodiment.

Step 310: The CCID determines if the channel extension command is a channel switch command: if so, go to step 312; otherwise, go to step 311.

To determine if the channel extension command is a channel switch command, the firmware program in the CCID gets the size of the packet, its position in the buffer of the CCID, and the identifier in the packet of the command stream (the $11^{th}$ and $12^{th}$ bytes) through the packet header of the channel extension command and the data length flag in the packet header. The identifier can be customized by the manufacturer. It can be used to learn the usage of the channel extension command. For example, "0x5aa5" means that the channel extension command is a channel switch command used for switching from a card slot to another.

Step 311: Perform an operation corresponding to the channel extension command and go to step 316.

The channel extension command can be used to encrypt/decrypt the data on the transfer channel, read data from the flash memory, or write data to the flash memory. The CCID can perform one of such operations. For example, the following command indicates to read data from the flash memory of the CCID (the $11^{th}$ and $12^{th}$ bytes are customized to define the operation): 6B 05 00 00 00 00 00 00 00 00 6066 84 00 08; and the following command indicates to write data to the flash memory of the CCID (the $11^{th}$ and $12^{th}$ bytes are customized to define the operation): 6B 05 00 00 00 00 00 00 00 00 6660 84 00 08.

Step 312: The firmware program in the CCID parses the received channel switch command and activates the specified card slot through the card slot switch circuit, and then the process goes to step 316.

The firmware program in the CCID parses the packet header of the channel switch command and learns the size of the packet, its position in the buffer of the CCID, and the identifier in the packet of the command stream through the data length flag in the packet header. The identifier can be customized by the manufacturer of the CCID. It can be used to indicate the usage of the channel switch command. If the identifier indicates that the channel switch command is used for card slot switch, the card slot to be activated can be determined by analyzing the $13^{th}$ byte of the channel switch command. Then, the circuit controller unit of the CCID activates the card slot accordingly.

In this embodiment, the reader driver compliant with the CCID standard from Microsoft is used. Thus, the Slot field (the $6^{th}$ byte) of the channel switch command is a fixed value "00".

For example, the following channel switch command indicates a random number instruction of the card slot 1 and its $13^{th}$ byte means card slot 1: 6B 04 00 00 00 00 00 00 00 00 5a a5 00 ff; and the following channel switch command indicates a random number instruction of the card slot 2 and its $13^{th}$ byte means card slot 2: 6B 04 00 00 00 00 00 00 00 00 5a a5 01 ff.

The circuit controller unit of the CCID can activate the card slot as follows: the card slot switch circuit of the CCID is adapted to include a CPU (Central Processing Unit), a CPU interface, a channel selection switch, and a circuit controller unit, in which the channel selection switch is coupled to each of the card slots (e.g. card slot 1, card slot 2, and card slot 3) of the CCID; the channel selection switch gets the circuit of the corresponding card slot connected under control of the circuit controller unit after the CCID has detected the number of the card slot.

Or, the circuit controller unit of the CCID can activate the card slot as follows: the card slot switch circuit of the CCID is adapted to include a CPU, more than one CPU interface, and a circuit controller unit, in which the more than one CPU interface are coupled to each of the card slots of the CCID respectively; the circuit controller unit gets the circuit between a CPU interface and an associated card slot connected after the CCID has detected the number of the card slot.

Step 313: The CCID determines if the interrupt is a card insertion/removal interrupt: if so, it goes to step 314; otherwise, it goes to step 315.

Step 314: The CCID creates a packet compliant with the CCID interface standard using the smart card insertion/removal event information, returns the packet to the host, and goes to step 316.

There are two cases for a card slot: a card has been inserted into the card slot or no card is inserted. If there is no card in the slot, a "No Card" interrupt signal will be produced. Otherwise, the card slot is in "unpowered with a card" status and a "Card inside" interrupt signal will be produced. After the host issues a power-up instruction and the smart card responds and returns an ATR (Answer to Reset), the card slot is brought into "powered with a card" status. If the host issues a power-off instruction, the card slot will be brought into "unpowered with a card" status again.

If a card slot has been activated, a "Card Inside" interrupt signal (0x5003) will be produced when a smart card is inserted into it. If a smart card is removed from a card slot, a "No Card" interrupt signal (0x5002) will be produced. If a card slot is in unactivated status, the insertion/removal event will not produce any interrupt signal.

Step 315: The CCID performs other operations and goes to step 316.

Step 316: The interrupt ends.

The above steps 301 through 314 are provided for the situation in which the same interrupt entry is used for the USB interrupt and the card insertion/removal event interrupt. If different interrupt entries are used for them, the steps 305 through 314 can be replaced with the following steps:

Step 305': When a USB interrupt is received, the CCID goes to a USB interrupt service;

Step 306': The CCID determines if the interrupt is a BULK-OUT interrupt: if so, it goes to step 307'; otherwise, it goes to step 313';

Step 307': The CCID receives a BULK-OUT packet and determines if the packet has been received properly: if so, it goes to step 308'; otherwise, it performs corresponding operations and goes to step 313';

Step 308': The CCID parses the content of the BULK-OUT packet and determines the type of the CCID command: if the command is a channel extension command, it goes to step 310'; otherwise, it goes to step 309';

Step 309': The CCID performs operations according to the type of the CCID command, creates a packet of the result of the operations, which is compliant with the CCID interface standard, and saves the packet to the buffer of the CCID;

Step 310': The CCID determines if the channel extension command is a channel switch command: if so, go to step 312'; otherwise, go to step 311';

To determine if the channel extension command is a channel switch command, the firmware program in the CCID gets the size of the packet, its position in the buffer of the CCID, and the identifier in the packet of the command stream (the $11^{th}$ and $12^{th}$ bytes) through the packet header of the channel extension command and the data length flag in the packet header. The identifier can be customized by the manufacturer. It can be used to learn the usage of the channel extension command. For example, "0x5aa5" means that the channel extension command is a channel switch command used for switching from a card slot to another.

Step 311': Perform an operation corresponding to the channel extension command and go to step 313';

The channel extension command can be used to encrypt/decrypt the data on the transfer channel, read data from the flash memory, or write data to the flash memory. The CCID can perform one of such operations. For example, the following command indicates to read data from the flash memory of the CCID (the $11^{th}$ and $12^{th}$ bytes are customized to define the operation): 6B 05 00 00 00 00 00 00 00 00 6066 84 00 08; and the following command indicates to write data to the flash memory of the CCID (the $11^{th}$ and $12^{th}$ bytes are customized to define the operation): 6B 05 00 00 00 00 00 00 00 00 6660 84 00 08.

Step 312': The firmware program in the CCID parses the received channel switch command and activates the specified card slot through the card slot switch circuit, and then the process goes to step 313';

The firmware program in the CCID parses the packet header of the channel switch command and learns the size of the packet, its position in the buffer of the CCID, and the identifier in the packet of the command stream through the data length flag in the packet header. The identifier can be customized by the manufacturer of the CCID. It can be used to indicate the usage of the channel switch command. If the identifier indicates that the channel switch command is used for card slot switch, the card slot to be activated can be determined by analyzing the $13^{th}$ byte of the channel switch command. Then, the circuit controller unit of the CCID activates the card slot accordingly.

In this embodiment, the reader driver compliant with the CCID standard from Microsoft is used. Thus, the Slot field (the $6^{th}$ byte) of the channel switch command is a fixed value "00".

For example, the following channel switch command indicates a random number instruction of the card slot 1 and its $13^{th}$ byte means card slot 1: 6B 04 00 00 00 00 00 00 00 00 5a a5 00 ff; and the following channel switch command indicates a random number instruction of the card slot 2 and its $13^{th}$ byte means card slot 2: 6B 04 00 00 00 00 00 00 00 00 5a a5 01 ff.

The circuit controller unit of the CCID can activate the card slot as follows: the card slot switch circuit of the CCID is adapted to include a CPU (Central Processing Unit), a CPU interface, a channel selection switch, and a circuit controller unit, in which the channel selection switch is coupled to each of the card slots (e.g. card slot 1, card slot 2, and card slot 3) of the CCID; the channel selection switch gets the circuit of the corresponding card slot connected under control of the circuit controller unit after the CCID has detected the number of the card slot.

Or, the circuit controller unit of the CCID can activate the card slot as follows: the card slot switch circuit of the CCID is adapted to include a CPU, more than one CPU interface, and a circuit controller unit, in which the more than one CPU interface are coupled to each of the card slots of the CCID respectively; the circuit controller unit gets the circuit between a CPU interface and an associated card slot connected after the CCID has detected the number of the card slot.

Step 313': The interrupt ends.

Alternatively, if different interrupt entries are used for the USB interrupt and the card insertion/removal event interrupt, the steps 305 through 314 can also be replaced with the following steps:

Step 305": When a card insertion/removal event interrupt is received, the CCID goes to the card insertion/removal event interrupt service;

Step 306": The CCID creates a packet based on the smart card insertion/removal event information, compliant with the CCID interface standard, and returns the packet to the host;

Step 307": The interrupt ends.

The above embodiment provides a method for accessing multiple card slots, enabling the reader driver for Windows or Linux to support access to multiple card slots.

Embodiment 4

Figure 4:
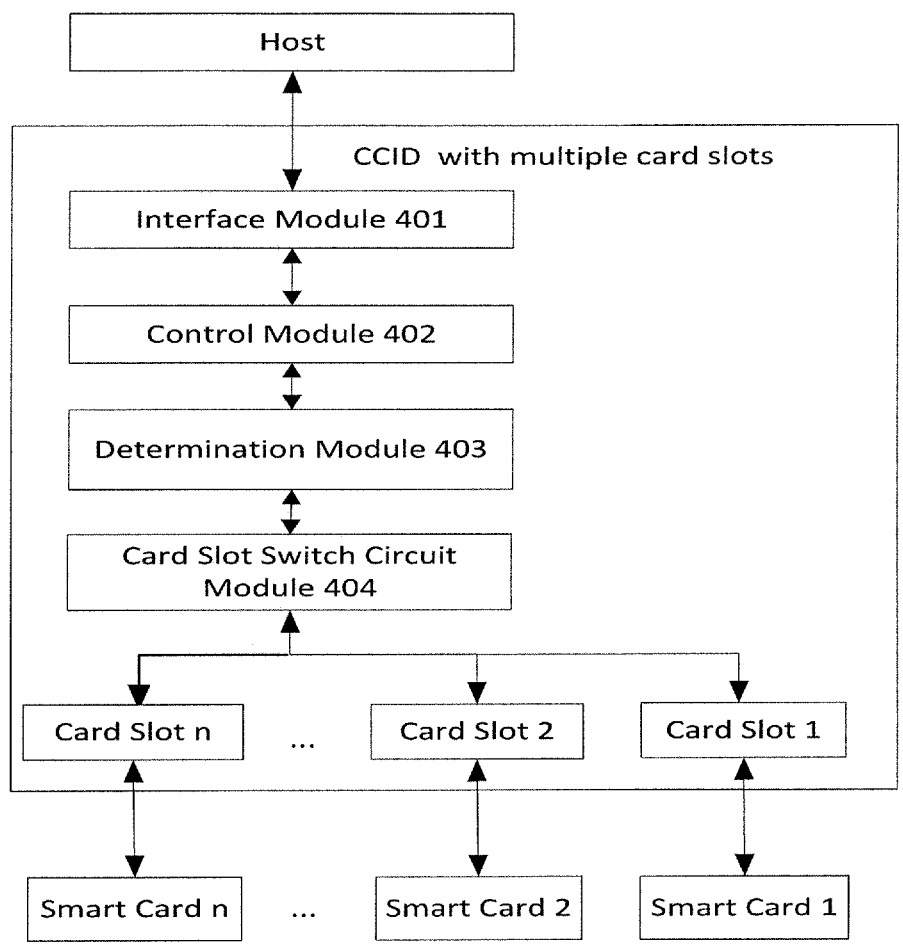
FIG. 4 is a block diagram of the apparatus for accessing multiple card slots in accordance with the fourth embodiment of the present invention.

This embodiment describes a CCID with multiple card slots. For information on how the device works, see the foregoing embodiments 1-3. Referring to FIG. 4, the device includes:

an interface module 401, coupled to a host and a control module 402 respectively, and adapted to communicate information between the host and the control module 402 (in this embodiment, the interface module 401 can be a USB interface module);

a control module 402, coupled to the interface module 401 and a determination module 403 respectively, and adapted to control the interface module 401 to receive a command stream issued by the host, control the determination module 403 to receive a response from a smart card transmitted through a card slot switch circuit module 404 and send the packet of the command stream to the smart card through the card slot switch circuit module 404, and control the interface module 401 to send a response packet compliant with the CCID standard to the host;

a determination module 403, coupled to the control module 402 and the card slot switch circuit module 404 respectively, and adapted to determine if smart card insertion/removal event information exists in the CCID, and if so, send the information to the host via the control module 402; and a card slot switch circuit module 404, coupled to the determination module 403 and a card slot, and adapted to receive the command stream from the control module 402, and activate a corresponding card slot according to the card slot number when receiving a channel switch command from the control module 402 or send the command to the smart card and transfer a response from the smart card to the determination module 403 when receiving a command other than the channel switch command.

The card slot switch circuit module 404 is coupled to Card Slot 1, Card Slot 2, ..., and Card Slot n, while these card slots can be connected with Smart Card 1, Smart Card 2, ..., and Smart Card n respectively.

For example, the card slot switch circuit module 404 is coupled to Card Slots 1 through 3 of a CCID. After the control module 402 obtains the number of the targeted card slot for the channel switch command, the card slot switch circuit module 404 enables and activates the specified card slot. For example, Card Slot 1 is activated if the number of the card slot is "0x00" in the channel switch command. If the number is "0x02", Card Slot 3 will be activated by the card slot switch circuit module 404.

The interface module 401 comprises a descriptor setting unit and an endpoint setting unit.

The descriptor setting unit is adapted to set a descriptor compliant with the CCID standard and its value. In this embodiment, the descriptor includes the device type descriptor and the card slot descriptor.

The CCID reports that it is a CCID to the host via the device type descriptor, and reports the number of card slots it supports to the host via the card slot descriptor.

The endpoint setting unit is adapted to declare at least a pair of IN/OUT endpoints used for implementing a response pipe and a command pipe as BULK-IN and BULK-OUT endpoints, and declares at least one IN endpoint used for implementing an event notification pipe as an interrupt endpoint.

The control module 402 comprises a receiving unit, a parsing unit, a obtaining unit, a calculation unit, a response forming unit, a first determination unit, a second determination unit, a first processing unit, a second processing unit, and a transmission unit.

The receiving unit is adapted to receive the command stream sent by the host through the interface module 401 and the response from the smart card.

The parsing unit is adapted to parse the received command stream.

The obtaining unit is adapted to obtain the first byte of the packet header of the command stream parsed by the parsing unit and learn the type of the command. If the first byte is "6B", the command is a channel extension command.

The calculation unit is adapted to determine the size of the packet in the command stream and its position in the transceiver buffer of the CCID according to a data size flag in the received command stream.

The response forming unit is adapted to form the response into a response packet compliant with the CCID standard.

The first determination unit is adapted to determine the type of the CCID command issued by the host according to the BULK-OUT packet received by the receiving unit.

The second determination unit is adapted to further determine if the channel extension command is a channel switch command in case the type of the CCID command is a channel extension command according to the determination of the first determination unit.

The first processing unit is adapted to perform an operation based on the type of the CCID command in case the type of the CCID command is not a channel extension command according to the determination of the first determination unit.

The second processing unit is adapted to perform an operation based on the type of the channel extension command in case the channel extension command is not a channel switch command according to the determination of the second determination unit.

The sending unit is adapted to send the command stream issued by the host to the smart card and return a response from the smart card to the host.

The second determination unit comprises means for obtaining the packet header of the channel switch command; means for learning the size of the packet and its position in the transceiver buffer of the CCID by the data size flag in the packet header of the channel switch command, and obtain an identifier (which is used to indicate the specific usage of the channel switch command) in the channel switch command packet; and means for checking the $13^{th}$ byte of the channel switch command and obtain the number of the card slot targeted by the command switch command in case the identifier indicates that the channel switch command is used to switch from one card slot to another.

The above embodiment provides a method for accessing multiple card slots, enabling the reader driver for Windows or Linux to support access to multiple card slots.

The embodiments above are preferred embodiments of the present invention, and should not be considered as limitation to the scope of the present invention. Any modifications, equivalent replacements, and improvements according to the principle or derived from the spirit of the present invention should fall into the scope of the present invention.

The invention claimed is:

1. A method for accessing multiple card slots, comprising the steps of:
    establishing a connection from a CCID with multiple card slots to a host, declaring at least a pair of IN/OUT endpoints used for implementing a response pipe and a command pipe as BULK-IN and BULK-OUT endpoints, declaring at least one IN endpoint used for implementing an event notification pipe as an interrupt endpoint, and declaring, by the CCID, the CCID itself as a device compliant with a CCID standard and the number of card slots supported by the CCID to the host;
    accessing the CCID by the host;
    receiving, by the CCID, a BULK-OUT packet and determining, by the CCID, a type of a CCID command issued by the host according to the BULK-OUT packet;
    determining whether the channel extension command is a channel switch command if the CCID command is a channel extension command, if so, parsing the channel switch command and activating a card slot the host tries to access; otherwise, performing an operation according to the type of the channel extension command; and
    performing an operation according to the type of the CCID command if the CCID command is not a channel extension command.

2. The method of claim 1, wherein the declaring the number of card slots supported by the CCID to the host comprises: sending a card slot descriptor by the CCID to the host, in which a byte is used to indicate the number of card slots supported by the CCID.

3. The method of claim 1, wherein the determining by the CCID the type of the CCID command issued by the host according to the BULK-OUT packet comprises: parsing a command stream compliant with the CCID standard by the CCID and obtaining the command type of the command stream through the first byte of a packet header of the command stream, in which the command stream is of a channel extension command if the first byte is "6B".

4. The method of claim 1, wherein the determining whether the channel extension command is a channel switch command comprises: parsing the channel extension command by the CCID and obtaining the type of the command according to an identifier field of the channel extension command, in which the identifier field is customized.

5. The method of claim 1, wherein the parsing the channel switch command and activating a card slot the host tries to access comprises: parsing the packet header of the channel switch command by a firmware program in the CCID; obtaining the size of the packet and its position in a transceiver buffer of the CCID by analyzing the data size flag in the packet header of the channel switch command and obtaining the identifier of the packet of the channel switch command, in which the identifier is used to indicate the usage of the channel switch command; if the channel switch command is used for switching from one card slot to another, checking the $13^{th}$ byte of the channel switch command to obtain the number of the card slot targeted by the channel switch command; and activating the card slot identified by the number of the card slot by a circuit control unit of the CCID.

6. The method of claim 1, wherein the method further comprises: determining if information on a smart card insertion/removal event in the activated card slot exists, if so, returning the information on a smart card insertion/removal event compliant with the CCID standard to the host; otherwise, continuing the step of receiving the BULK-OUT packet by the CCID.

7. The method of claim 6, wherein the determining if information on a smart card insertion/removal event exists comprises: determining if the information on a smart card insertion/removal event exists in the transceiver buffer of the CCID, wherein the information on a smart card insertion/removal event is written to the transceiver buffer when the CCID has received an interrupt signal of smart card insertion/removal.

8. A CCID with multiple card slots, wherein the CCID comprises an interface module, a control module, a determination module, and a card slot switch circuit module, in which:
    the interface module is coupled to a host and the control module respectively and is adapted to communicate information between the host and the control module;
    the control module is coupled to the interface module and the determination module respectively and is adapted to control the interface module to receive a command stream issued by the host, control the determination module to receive a response from a smart card and send a packet of the command stream to the smart card, and control the interface module to send a response packet compliant with the CCID standard to the host;
    the determination module is coupled to the control module and the card slot switch circuit module respectively and is adapted to determine if information on a smart card insertion/removal event exists in the CCID and if so, return the information to the host via the control module; and
    the card slot switch circuit module is coupled to the determination module and the multiple card slots respectively and is adapted to receive the command stream transmitted by the control module and activate a card slot according to the number of card slot in case a channel switch command is received from the control module, or if a command other than the channel switch command is received from the control module, send the command to the smart card and then send a response packet from the smart card to the determination module.

9. The CCID of claim 8, wherein the interface module comprises a descriptor setting unit and an endpoint setting unit, in which:

the descriptor setting unit is adapted to set up a device type descriptor and a card slot descriptor compliant with the CCID standard, with which the CCID reports itself to the host as a CCID and reports to the host the number of card slots it supports respectively; and the endpoint setting unit is adapted to set at least a pair of IN/OUT endpoints used for implementing a response pipe and a command pipe to a BULK-IN endpoint and a BULK-OUT endpoint and declaring at least one IN endpoint used for implementing an event notification pipe as an interrupt endpoint.

10. The CCID of claim 8, wherein the control module comprises:

a receiving unit adapted to receive a command stream from the host through the interface module and receive a response from the smart card through the determination module;

a parse unit adapted to parse the command stream received by the receiving unit;

an obtaining unit adapted to parse the first byte of the packet header of the command stream processed by the parse unit and obtain the type of the command stream, and if the first byte is "6B", the command stream is of channel extension command;

a calculation unit adapted to determine the length of the data packet of the command stream and its position in the transceiver buffer of the CCID according to the flag of data length in the command stream received by the receiving unit;

a response forming unit adapted to convert a response to a response packet compliant with the CCID standard;

a first determination unit adapted to determine the type of the CCID command issued by the host according to the BULK-OUT packet received by the receiving module;

a second determination unit adapted to determine if the channel extension command is a channel switch command when the CCID command is a channel extension command which has been determined by the first determination unit;

a first processing unit adapted to perform an operation according to the type of the CCID command when the CCID command is not a channel extension command which has been determined by the first determination unit;

a second processing unit adapted to perform an operation according to the type of the channel extension command when the channel extension command is not a channel switch command which has been determined by the second determination unit; and a sending unit adapted to send the command stream issued by the host to the smart card and send a response from the smart card to the host.

11. The CCID of claim 10, wherein the second determination unit comprises:

means for obtaining the packet header of the channel switch command;

means for learning the size of the packet and its position in the transceiver buffer of the CCID by the data size flag in the packet header of the channel switch command, and obtaining an identifier in the channel switch command packet, the identifier being used to indicate the specific usage of the channel switch command; and means for checking the $13^{th}$ byte of the channel switch command and obtaining the number of the card slot targeted by the command switch command in case the identifier indicates that the channel switch command is used to switch from one card slot to another.

12. The CCID of claim 8, wherein the determination module is particularly adapted to determine if information on a smart card insertion/removal event exists in the transceiver buffer of the CCID, wherein the information on a smart card insertion/removal event is written to the transceiver buffer when the CCID has received an interrupt signal of smart card insertion/removal.

* * * * *